US008305293B2

(12) United States Patent
Chu

(10) Patent No.: US 8,305,293 B2
(45) Date of Patent: Nov. 6, 2012

(54) PORTABLE DUAL DISPLAY READER AND OPERATION SYSTEM THEREOF

(76) Inventor: Chun-Wei Chu, Taipei (TW)

( * ) Notice: Subject to any disclaimer, the term of this patent is extended or adjusted under 35 U.S.C. 154(b) by 616 days.

(21) Appl. No.: 12/545,897

(22) Filed: Aug. 24, 2009

(65) Prior Publication Data
US 2010/0103074 A1 Apr. 29, 2010

(51) Int. Cl.
*G09G 5/00* (2006.01)
(52) U.S. Cl. .......... 345/1.3; 345/104; 345/108; 345/502
(58) Field of Classification Search .......... None
See application file for complete search history.

(56) References Cited

U.S. PATENT DOCUMENTS

| 5,761,485 A | 6/1998 | Munyan | |
|---|---|---|---|
| 2005/0174299 A1* | 8/2005 | Park et al. | 345/1.1 |
| 2006/0208993 A1* | 9/2006 | Jung | 345/98 |

FOREIGN PATENT DOCUMENTS

| CN | 1203679 A | 12/1998 |
|---|---|---|
| TW | M251406 | 11/2004 |
| TW | 200835324 | 8/2008 |

OTHER PUBLICATIONS

Counterpart office action by Taiwan Patent Office on Aug. 6, 2012.

* cited by examiner

*Primary Examiner* — Muhammad N Edun

(57) ABSTRACT

The present invention provides a portable dual display reader including a first panel, a second panel, and an embedded system. The second panel attaches to one side of the first panel to be selectively in a folded configuration and an unfolded configuration. The embedded system is coupled to either the first panel or second panel. The embedded system has a microprocessor, a data source, and an operation system. The microprocessor processes or compiles a data string from the data source and displays the data string simultaneously on the first panel and the second panel. The operation system allows a user to enter at least one command to drive the related hardware apparatus of the embedded system, so as to accomplish the operation of the command. The data string further includes a first data string. The operation system cuts the first data string into several data segments and selectively displays the data segments on the first panel and the second panel in a sequential or non-sequential mode.

15 Claims, 5 Drawing Sheets

PORTABLE DUAL DISPLAY READER AND OPERATION SYSTEM THEREOF

BACKGROUND OF THE INVENTION

1. Field of the Invention

The present invention relates to a portable electronic display reader. Specifically, the present invention relates to a portable dual display reader with a built-in embedded system for operating two display panels.

2. Description of the Prior Art

As shown in FIG. 1, a conventional portable display reader 100 only has one display panel 110. When the size of data to be viewed exceeds a display panel 110, a user must scroll through the display window to view the full content. If the user would like to look different pages, he/she has to scroll the display window up and down. The operation is troublesome, inconvenient, and falls short of paper books since the user cannot turn or flip pages, or compare different pages as he/she normally would with paper books.

SUMMARY OF THE INVENTION

One objective of the present invention is to provide a portable dual display reader and an operation system thereof, wherein the portable dual display reader can select whether it is in folded or unfolded configuration by user.

Another objective of the present invention is to provide a portable dual display reader and an operation system thereof for easy operation and multiple display modes.

The present invention provides a portable dual display reader which includes a first panel, a second panel, and an embedded system. The second panel is attached to one side of the first panel and can be in either a folded configuration or an unfolded configuration. The embedded system is coupled to the first panel or the second panel. The embedded system has a microprocessor, a data source, and an operation system. The microprocessor processes or compiles a data string from the data source and displays the data string simultaneously on the first panel and the second panel. The operation system allows a user to enter at least one command to drive the related hardware apparatus of the embedded system to accomplish the command operation. The data string also includes a first data string. The operation system cuts the first data string into a plurality of data segments and selectively displays the data segments on the first panel and the second panel in either a sequential or a non-sequential mode.

The operation system allows the portable dual display reader to operate and display two successive pages on the first panel and the second panel so that users may read the content as they normally read paper books, or control the display mode of each data segment on each panel. For example, the display mode includes a non-sequential mode to display different parts of a document, an exchange mode to exchange the position where text is displayed or move content displayed in both panels into one panel. The data string also includes a second data string. The second data string has sequential data segments which can be cut into a plurality of data segments. From these sequential data segments, a data segment is selected to display along with the data segment of the first data string either correlatively or non-correlatively.

In a preferred embodiment, the first panel and the second panel respectively include an input interface device, such as a touch screen, keyboard, mouse, touch pen, key switch, or etc, for easy operation by users. The microprocessor further includes a multi-display chip. With the multi-display chip, the microprocessor respectively displays the data from the data string on both the first panel and the second panel. However, in a different embodiment, by using a built-in application program or firmware, the microprocessor can also display the data string on both the first panel and the second panel.

The present invention further provides an operation system for a portable dual display reader to use with a first panel and a second panel. The first panel and the second panel are respectively coupled to an embedded system. The embedded system has a microprocessor, at least one multi-display chip, and a data source. The data source further includes a first data string and a second data string. The operation system performing an operation includes: step 1, cutting the first data string into a plurality of data segments and selectively displaying the data segments on the first panel or the second panel in a sequential or non-sequential mode; step 2, reading the second data string to be displayed along with the data segments of the first data string correlatively or non-correlatively.

DETAILED DESCRIPTION OF THE PREFERRED EMBODIMENTS

The present invention provides a portable dual display reader which allows users to read it as a traditional paper book and can be folded to be carried around conveniently or for easy storage. Embodiments and related steps of the present invention are detailed as follows accompanied with drawings.

Figure 1:
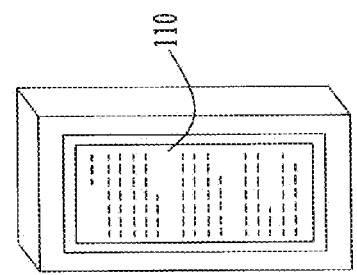
FIG. 1 is a perspective view of a conventional electronic reader.
Figure 2B:
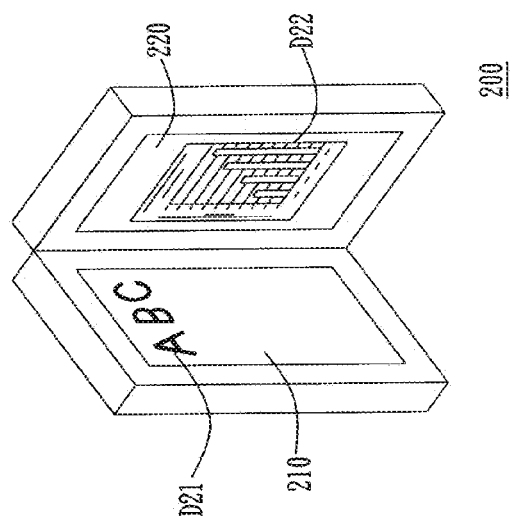
FIG. 2B illustrates a perspective view of FIG. 2A when the present invention is opened.
Figure 2A:
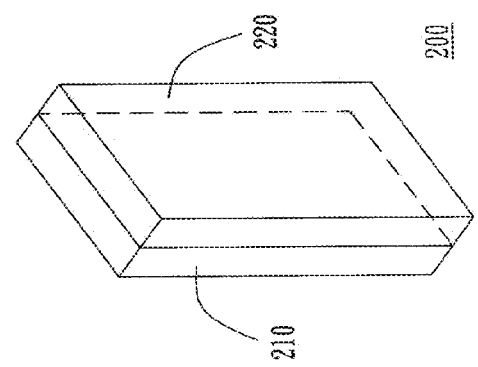
FIG. 2A illustrates a folded perspective view of a portable dual display electronic reader according to the present invention.
Figure 3A:
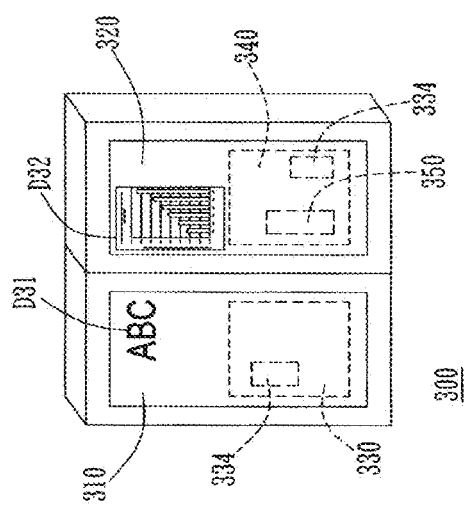
FIG. 3A illustrates a partly perspective view of the portable dual display electronic reader according to the present invention.
Figure 3C:
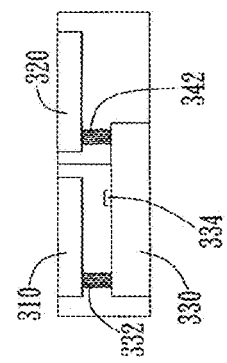
FIG. 3C illustrates another perspective view of the embedded system coupled to the first panel and the second panel of the present invention.
Figure 3B:
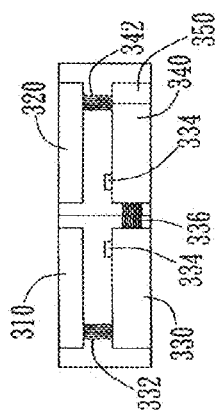
FIG. 3B illustrates a perspective view of an embedded system coupled to a first panel and a second panel of the present invention.

As shown in FIGS. 2A and 2B, a portable dual display reader 200 of the present invention includes a first panel 210 and a second panel 220. The second panel 220 is attached to one side of the first panel 210 to be selectively in a folded configuration or an unfolded configuration. According to the embodiment shown by FIG. 2B, the portable dual display reader 200 supports showing display contents D21 and D22 in different file formats. As shown in FIGS. 3A and 3B, the present invention further includes embedded systems 330 and 340 respectively disposed in a portable dual display reader 300. The embedded systems 330 and 340 respectively include a micro processor 334, a data source 350, and an operation system (OS).

Referring to the embodiments shown in FIGS. 3A and 3B, the embedded systems 330 and 340 are respectively used with a first panel 310 and a second panel 320 and are electrically connected to each other via circuit boards 332, 336 and 342. However, according to an embodiment shown in FIG. 3C, the embedded system 330 and the microprocessor 334 can be integrated to one microprocessor 334 with only one printed circuit board, so as to control the first panel 310 and the second panel 320 at the same time. In the present embodiment, the operation system is preferably installed in the data source 350, e.g. a flash memory or a hard disc. However, in a different embodiment, the data source 350 further includes a flash memory, a storage disc, a memory card, a portable external hard disc, or other suitable storage medium.

The microprocessor 334 processes or compiles a data string from the data source 350 and displays the data string on the first panel 310 and the second panel 320. According to the different kinds of data strings generated, for example compressing or decompressing MP3/MP4, reading or storing the data, playing or recording a media format or an audio format, controlling a user interface, and etc., while the microprocessor 334 processes those data strings, an application program or a firmware can be installed therein to process the data strings displaying them on the first panel 310 and the second panel 320. However, in an embodiment shown in FIG. 4, the microprocessor 334 also can display the data strings with use of a multi-display chip 338, or an additional built-in display chip.

Furthermore, the data string preferably includes a first data string. By using the operation system, the microprocessor 334 can cut the first data string into a plurality of data segments such as text, graphs, or figures, and selectively display the data segments on the first panel 310 or the second panel 320 in a sequential mode or a non-sequential mode. In the embodiment shown in FIG. 3A, the data segments are preferably cut into text and graphs, i.e. the display contents D31 and D32, to be displayed respectively on the first panel 310 and the second panel 320 in the sequential mode. The abovementioned cutting of the data string is preferable cut into different data segments according to file sizes, pages, or file formats. However, in different embodiments, the data string can also be made to form the data segments as desired by way of copy, format transformation, editing, delete, or other proper operations. In terms of editing, format transformation, creation of the data string or the data segments, these actions can be done using the application program, the firmware, or the operation system.

Figure 4:
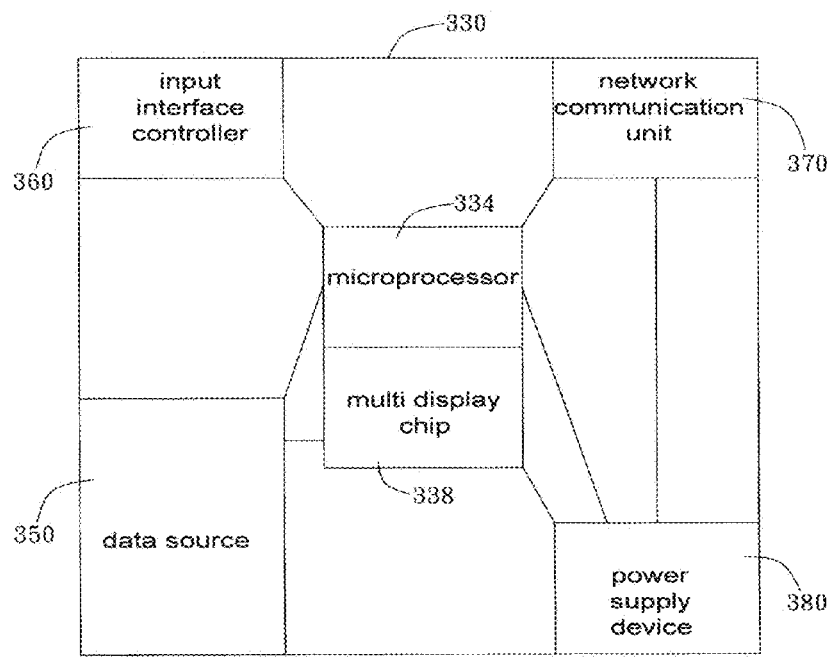
FIG. 4 illustrates a block diagram of the embedded system of the portable dual panel electronic reader of the present invention.
Figure 5:
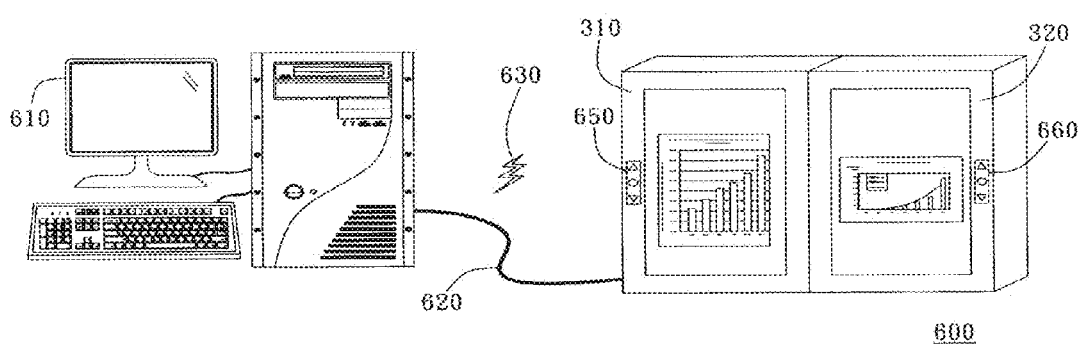
FIG. 5 illustrates a perspective view of a computer host linking to the present invention.
Figure 6A:
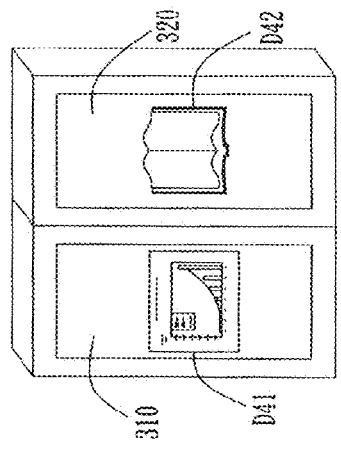
FIGS. 6A, 6B, 6C and 6D illustrate various views of the display mode of different data of the dual display electronic reader according to the present invention.
Figure 6B:
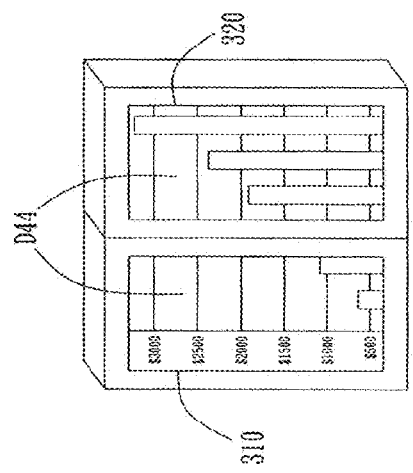
Figure 6C:
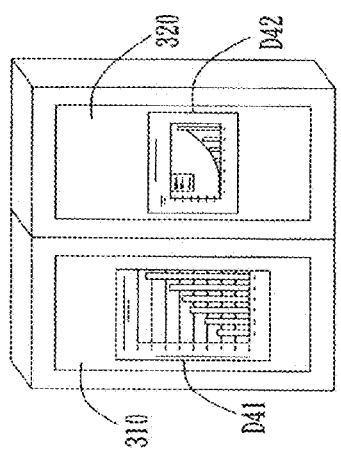
Figure 6D:
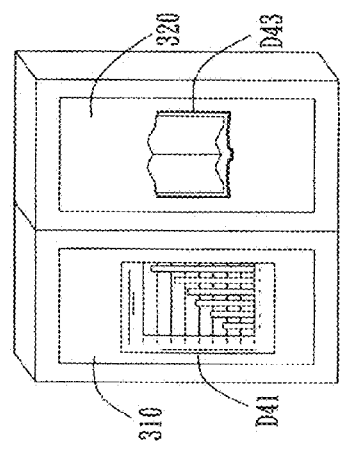
Figure 7:
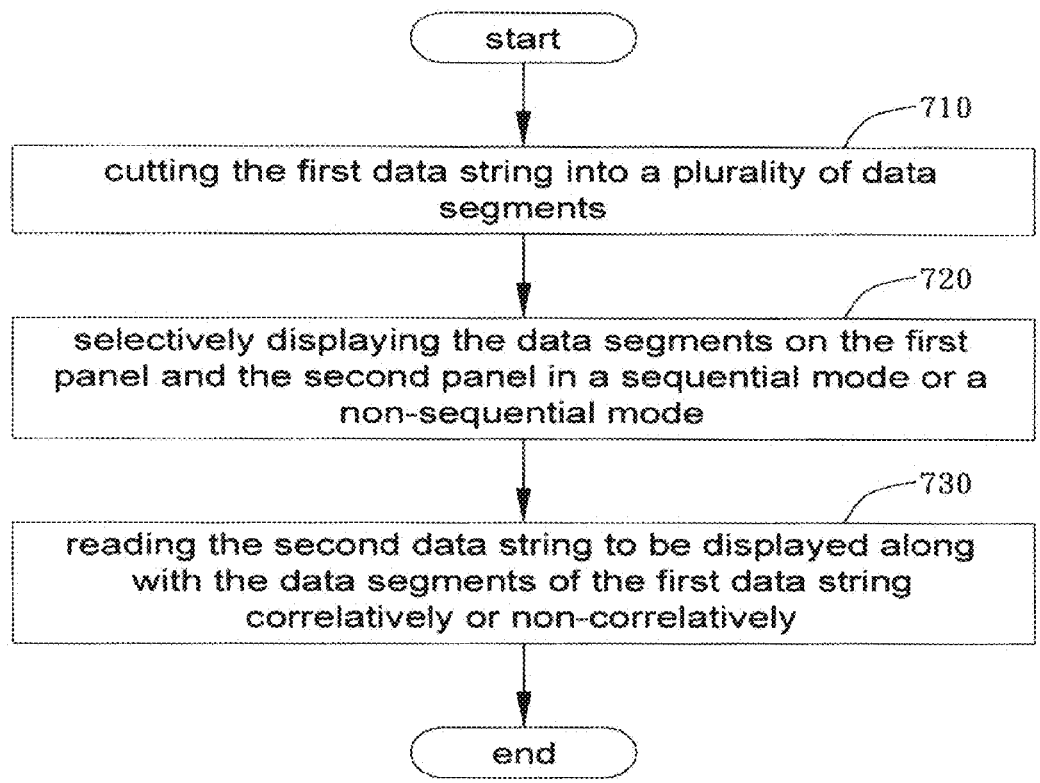
FIG. 7 illustrates an operation block diagram of an operation system of the portable dual display electronic reader according to the present invention.

As shown in FIGS. 4 and 5, the embedded system 330 further includes an input interface controller 360, a network communication unit 370, and a power supply device 380. The input interface controller 360 is provided for use with the input interface devices 650 and 660. In the embodiment shown in FIG. 5, the input interface devices 650 and 660 include buttons, built-in keyboards, or external keyboards. However, in a different embodiment, the input interface devices 650 and 660 may also include a touch screen, a touch pen, a mouse, or other suitable input devices. The network communication unit 370 is provided to link with a computer host 610 and can upload or download the first data string or other data segments between the computer host 610 and the embedded system. In the embodiment shown by FIG. 5, the portable dual display reader 600 links to a local area network by using a wiring mode 620 or a wireless mode 630. The power supply device 380 is used to supply power to the hardware components of the embedded system 330 and is preferably a rechargeable lithium battery cell, a polymer rechargeable battery cell, or other rechargeable battery cells. The power supply device 380 may have a power saving function and work with use of the operation system or other application programs. However, in a different embodiment, the power supply device 380 can be an alkaline battery cell.

When the operation system is used by a user to, for example, read and open a certain file format, one page being one data segment by file itself or by the setting of the operation system, the operation system displays the data segments (e.g. the previous page and the next page) on the first panel 310 or second panel 320 in a sequential mode. Meanwhile, via the input interface devices 650 and 660, the operation system further controls the display mode of each of the data segments to be displayed on the first panel 310 or the second panel 320. Therefore, as shown by FIGS. 6A to 6D, via the input interface devices 650 and 660, the operation system can control the data segments D41, D42, D43, and D44 to be displayed on the first and second panels 310 and 320 in the display mode desired, such as non-sequential mode (i.e., jump display), real-time switching or simultaneously displaying the data segments, zooming in or zooming out one of the data segments, sorting the data segments randomly or in order, or exchanging display positions of the data segments on the first panel 310 and/or the second panel 320.

Moreover, in the abovementioned display mode, the present embodiment supports calling or looking for the second data string and analyzing the second data string to display it along with the data segments of the first data string correlatively or non-correlatively. Analyzing the second data string is like the process of analyzing the first data string. A sequential data segment of the second data string is cut, edited, or processed to make a plurality of data contents. Then, one of the data contents is selected to be displayed and compared with the data segments of the first data string and to mark, revise, or save the content after comparison. In other words, the user can select which data contents from the second data string from the first data segments from there make comparisons, marks, revisions, and save the changed contents. The second data string is preferably obtained from the built-in/external data source 350 or links from the Internet.

To achieve the abovementioned operations and display modes, the operation system usually works with various software and hardware which is installed in a particular device driver, application software, firmware, or kernel, to act as a bridge between the hardware and the users. Moreover, in view of the development of open source software, the operation system of the present invention may be designed concerning Linux, Windows Mobile, Mac OS, or other operation systems to carry out desired functions of the portable dual display reader 600. Alternatively, the operation of the portable dual display reader 600 may be achieved by installing particular software cooperating with particular application program, kernel, driver, hardware, or etc directly. According to different requirements, the operation system of the present embodiment may be realized by cooperating with various software and hardware.

The present invention further provides an operation system for a portable dual display electronic reader to use with a first panel and a second panel. The first panel and the second panel are coupled to an embedded system that has a microprocessor and a data source. The data source further includes a first data string and a second data string. The operation system performing an operation includes: in step 710, the first data string is cut into a plurality of data segments; in step 720, the data segments are selectively displayed on the first panel and the second panel in a sequential mode or a non-sequential mode; in step 730, the second data string is selected to display along with the data segments of the first data string correlatively or non-correlatively.

In step 710 and 720, when displaying the data segments on the first panel or the second panel, the operation system controls the display mode for each data segment to be displayed on the first panel or the second panel. The display mode for each data segment to be displayed on the first or second panel can be further controlled by an input interface device, e.g. real-time switching or simultaneously displaying the data segments, zooming in or zooming out a certain data segment, sorting the data segments in order or randomly, or exchanging display positions of the data segments. In step 730, reading the sequential data segment includes searching and displaying relative or irrelative data to disclose it or compare it with the data segments of the first data string; after comparison, marking, editing, saving, or performing other necessary steps can be performed on the data.

The foregoing descriptions of the particular embodiments of the present invention are not intended to limit the invention to the embodiment described. It is recognized that modifications within the scope of the invention will occur in light of the above descriptions. Such modifications and equivalents of the invention are intended for inclusion within the scope of this invention. The embodiments were chosen and described in order to best explain the principles of the present invention and its practical application.

What is claimed is:

1. A portable dual display reader, comprising:
   a first panel;
   a second panel coupled to a side of the first panel to be selectively in a folded configuration and an unfolded configuration;
   a first embedded system coupled to the first panel, the first embedded system having a first microprocessor; and
   a second embedded system coupled to the second panel and the first embedded system, the second embedded system having a second microprocessor, a data source, and an operation system, the first microprocessor and the second microprocessor processing or compiling a data string from the data source and displaying the data string simultaneously on the first panel and the second panel, the operation system allowing a user to enter at least one command to drive the first embedded system and the second embedded system, so as to accomplish the operation of the command;
   wherein the data string further includes a first data string, the operation system cuts the first data string into a plurality of data segments and selectively displays the data segments on the first panel and the second panel in a sequential mode or a non-sequential mode.

2. The portable dual display reader of claim 1, wherein the data segments are selectively displayed on the first panel and the second panel by controlling a display mode of data segment to be displayed on the first panel or the second panel by the operation system.

3. The portable dual display reader of claim 2, wherein the display mode of each data segment to be displayed on the first panel or the second panel includes real-time switching or simultaneously displaying the data segments, zooming in or zooming out one of the data segments, sorting the data segments randomly or in order, or exchanging display positions the data segments.

4. The portable dual display reader of claim 1, wherein the data string further includes a second data string, the second data string has a sequential data segment, and a portion of the sequential data segment is selected to be displayed along with the data segments of the first data strong correlatively or non-correlatively.

5. The portable dual display reader of claim 4, wherein selecting the sequential data segment further includes searching a correlative data or a non-correlative data and displaying the correlative data or the non-correlative data to be compared with or to disclose the data segments of the first data string.

6. The portable dual display reader of claim 1, wherein the first panel and the second panel respectively have an input interface device allowing the user to operate the operation system.

7. The portable dual display reader of claim 6, wherein the input interface device includes a touch screen, a keyboard, a mouse, a touch pen, and a key switch.

8. The portable dual display reader of claim 1, wherein the microprocessor further includes a multi-display chip to display the data string on the first panel and the second panel, respectively.

9. The portable dual display reader of claim 1, wherein the embedded system further includes a network communication unit, a hardware driver, and a firmware, the network communication unit has a wire or wireless transmission function for acquiring the first data string, the hardware driver and the firmware are controlled by the operation system to accomplish the command of the user.

10. The portable dual display reader of claim 1, wherein the embedded system further includes a power supply device having a power saving mode and a power storing mode.

11. The portable dual display reader of claim 1, wherein the data source includes a hard disk, a flash memory, a storage disc, or a memory card.

12. An operation system for a portable dual display reader to use with a first panel and a second panel, the first panel and the second panel respectively coupled to a first embedded system having a first microprocessor and a second embedded system having a second microprocessor, an operating system, and a data source, wherein the data source further includes a first data string and a second data string, and the operation system performing an operation comprising:
   cutting the first data string into a plurality of data segments;
   selectively displaying the data segments on the first panel and the second panel in a sequential mode or a non-sequential mode;
   reading the second data string to be displayed along with the data segments of the first data string correlatively or non-correlatively; and
   searching and displaying correlative data or non-correlative data to be compared with or to disclose the data segments of the first data string.

13. The operation system of claim 12, wherein the data segments are selectively displayed on the first panel or the second panel by controlling a display mode of each data segment to be displayed on the first panel and the second panel by the operation system.

14. The operation system of claim 13, wherein the display mode of each data segment to be displayed on the first panel or the second panel includes real-time switching or simultaneously displaying the data segments, zooming in or zooming out one of the data segments, sorting the data segments randomly or in order, or exchanging display positions of the data segments.

15. The operation system of claim 13, wherein controlling the display mode of each data segment includes operating an input interface device to display the data segments in the sequential mode or the non-sequential mode.

* * * * *